United States Patent
Gaither et al.

(10) Patent No.: US 7,600,079 B2
(45) Date of Patent: Oct. 6, 2009

(54) PERFORMING A MEMORY WRITE OF A DATA UNIT WITHOUT CHANGING OWNERSHIP OF THE DATA UNIT

(75) Inventors: Blaine D. Gaither, Fort Collins, CO (US); Judson E. Veazey, Fort Collins, CO (US); Patrick Knebel, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 411 days.

(21) Appl. No.: 11/553,813

(22) Filed: Oct. 27, 2006

(65) Prior Publication Data

US 2008/0104336 A1  May 1, 2008

(51) Int. Cl.
*G06F 12/00* (2006.01)

(52) U.S. Cl. .................. 711/141; 711/144; 711/154; 711/156; 711/163

(58) Field of Classification Search ............ None
See application file for complete search history.

(56) References Cited

U.S. PATENT DOCUMENTS

| | | | | |
|---|---|---|---|---|
| 5,263,144 | A * | 11/1993 | Zurawski et al. | 711/121 |
| 5,522,058 | A * | 5/1996 | Iwasa et al. | 711/145 |
| 5,978,874 | A * | 11/1999 | Singhal et al. | 710/107 |
| 6,640,289 | B2 * | 10/2003 | McCrory et al. | 711/144 |
| 6,782,436 | B1 * | 8/2004 | Baker | 710/43 |
| 7,210,006 | B2 * | 4/2007 | Cypher | 711/145 |
| 2004/0073754 | A1 * | 4/2004 | Cypher | 711/143 |

* cited by examiner

*Primary Examiner*—Jack A Lane

(57) ABSTRACT

A method comprises, while a first device has ownership of a data unit, a second device issuing a request to perform a memory write of said data unit. The method further comprises a memory controller performing the memory write without changing ownership to the second device.

14 Claims, 2 Drawing Sheets

PERFORMING A MEMORY WRITE OF A DATA UNIT WITHOUT CHANGING OWNERSHIP OF THE DATA UNIT

BACKGROUND

Many computer systems include a memory subsystem for which multiple devices within the system (e.g., processors, input/output devices, etch) can issue reads and writes. For example, multiple devices within the system can issue a write to the same line of data within the memory subsystem. To insure coherency of the data, a mechanism such as a directory structure is implemented. In a directory structure, the state of each line of data is stored and managed. The state information may indicate, for example, the "ownership" of each line. A device can write data to a target line of data once that device is granted ownership of the data. Restricting writing a line of data to only the one device that is given ownership rights protects against coherency problems that otherwise would result if multiple devices were permitted to write concurrently to the same line of data.

The directory itself is typically stored in memory and thus memory reads and writes of the directory are performed simply to maintain data coherency. Unfortunately, bus bandwidth (particular for memory writes) may be limited in some systems. Having to write and read the directory is useful to maintain data coherency, but contributes to the bandwidth problem.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . " Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection.

DETAILED DESCRIPTION

Figure 1:
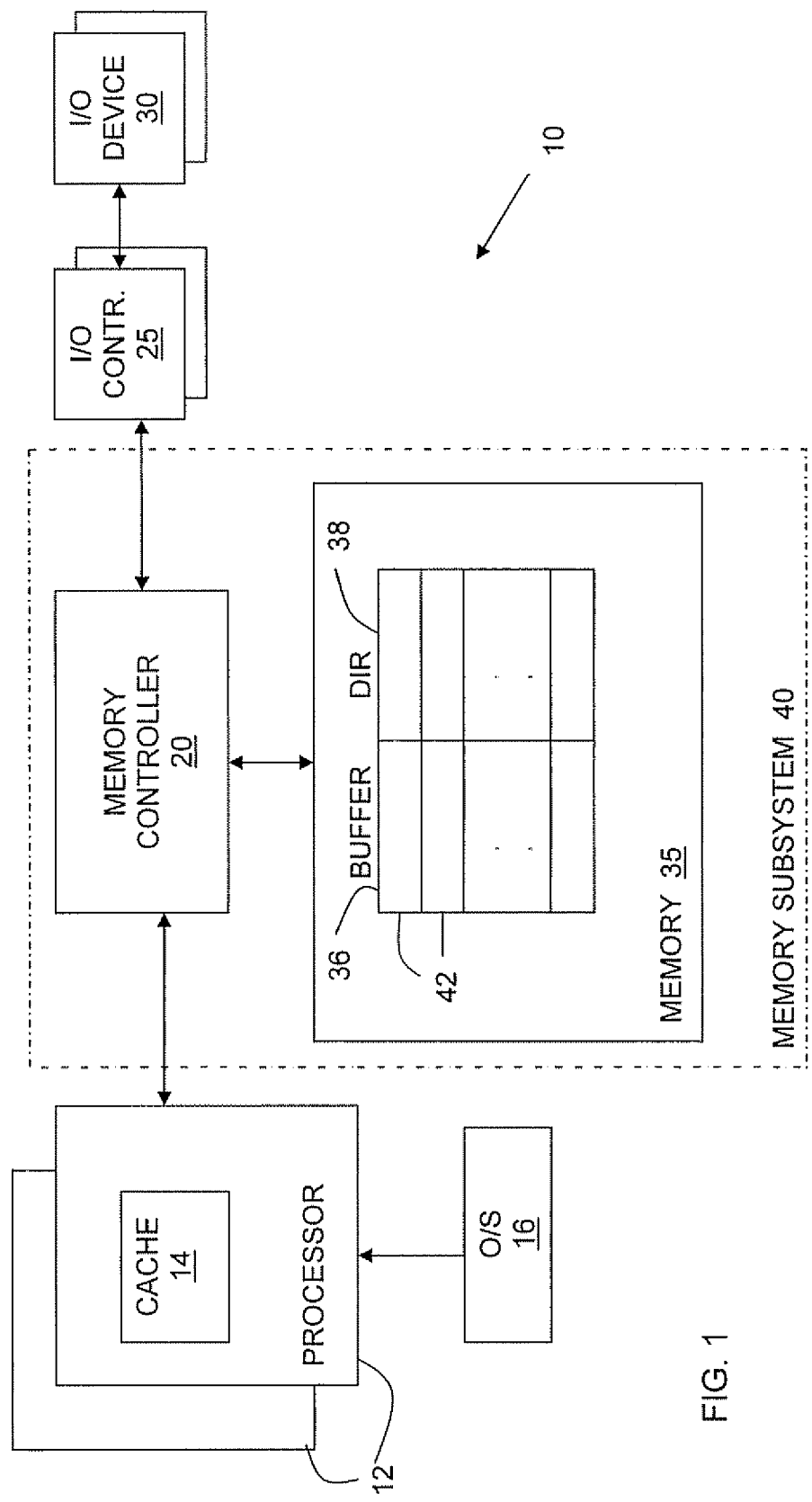
FIG. 1 shows a system in accordance with embodiments of the invention.

FIG. 1 shows a system 10 in accordance with embodiments of the invention. As shown, system 10 comprises one or more processors 12, a memory controller 20, one or more input/output (I/O) controllers 25, and memory 35. The memory controller 20 and memory 35 form a memory subsystem 40. An operating system 16 is also provided that is executed by each processor 12. The system 10 may also comprise or be coupled to one or more I/O devices 30. Each I/O device may be a storage device (e.g., a floppy disk drive, Universal Serial Bus (USB) storage device) or other type of I/O device.

To the extent the system 10 comprises more than one I/O device 30, each such I/O device is associated with an I/O controller 25. Each I/O controller 25 interacts with its associated I/O device on behalf of the host system 10 (e.g., processor 12). For example, the I/O controller 25 may retrieve data from the I/O device and provide such I/O data to the processor 12 for further processing. The processor 12 can also send data and/or commands to the I/O device 30 via the I/O controller 25.

In accordance with embodiments of the invention, each I/O controller 25 sends I/O data from the associated I/O device to the processor 12 via the memory 35. Specifically, the I/O controller 25, in at least some embodiments, writes I/O data from the associated I/O device 30 to a buffer 36 allocated within the memory 35 by the O/S 16. The processor 12 then can read the I/O data from the buffer 36. This process repeats itself with the I/O controller 25 writing I/O data to the buffer 36 for subsequent retrieval and processing by the processor 12.

The memory controller 20 directly interacts with the memory 35 on behalf of the I/O controller 25 and processor 12. For example, the memory controller 20 receives write requests from the I/O controller 25 and writes the specified data to the buffer 36. The memory controller 20 also receives read requests from the processor 12 and retrieves the targeted data from the buffer 36 and provides such data to the processor.

As described above, the I/O controller 25 provides data to the processor 12 by way of a buffer 36 (also called an "I/O buffer"). To the extent, multiple I/O controllers 25 and I/O devices are present in system 10, the O/S 16 allocates a separate I/O buffer 36 for each such I/O controller 25 to use in communicating with a processor 12.

The memory 35 comprises, for example, random access memory (RAM). The memory 35 may comprise a combination of cache memory and main system memory. Cache memory comprises RAM that generally permits faster access than main system memory. The memory subsystem 40 implements a memory hierarchy containing one or more levels of cache memory and main system memory. Cache memory is organized according to data units of segmentation (such as "lines"). Each line may comprise, for example, 64 bytes of data. The data comprising buffer 36 is thus organized into multiple lines 42 of storage. If the data that is targeted by, for example, a read request is already stored in cache, the requested data is retrieved from cache and not main system memory. This situation is referred to as a cache "hit." A cache "miss," on the other hand and in some embodiments, is when the requested read data is not resident in cache memory and the memory controller 20 is thus forced to retrieve the requested data from main system memory.

Because multiple devices (e.g., processors 12) can read and write memory 35, it is possible that a data value is read from memory by multiple devices. In that situation, multiple copies of the same data are given to multiple devices. The data could become incoherent if multiple such devices were permitted to alter their copies.

Accordingly, the memory subsystem 40 implements a directory-based data coherency mechanism. Associated with each data unit (e.g., line 42) of the buffer 36 is directory information 38. The directory information 38 (or simply "directory") may be provided as part of the "tag" information associated with each line. The directory 38 contains the state of the associated line 42. Examples of states include modified (M), exclusive (E), shared (S), and invalid (I), collectively referred to as the "MESI" protocol. If a particular line is in the shared state, the directory 38 will also identify the devices (e.g., processors 12) that have copies of data from the line.

The directory 38 also identifies the "owner" of the given line. In some situations, only the owner of a given line is permitted to write the line to memory 35. Thus, a processor that does not currently have ownership of a line that that processor is trying to write requests ownership of the line from the memory controller 20. The memory controller 20 accesses the directory entry associated with the target line, determines that another processor 12 has ownership of the target line, and performs whatever action is required to change ownership of the line to the processor requesting ownership. The action may include, for example, forcing the current owner to provide its copy of the line to the memory controller and to invalidate its copy. Once ownership is changed to the processor requesting ownership, such processor can then write its copy of the data to memory 36.

In some embodiments, however, a device is permitted to write a line of data to memory without being granted ownership of the line. In various embodiments, the operating system 16 allocates an I/O buffer 36 for use by a particular I/O controller 25 to communicate its I/O data to a processor 12. The O/S 16 restricts write access to the I/O buffer 36 to only one particular I/O controller 25. An "active" I/O buffer is an I/O buffer that has been allocated to an I/O device for reading or writing purposes. Accordingly, no other I/O controller 25, or processor 12 for that matter, is able to write the an active I/O buffer 36. That being the case, the I/O controller 25 permitted to write the I/O buffer 36 need not be given ownership of the lines of the buffer in order to write to the buffer. Because there is no change in ownership, there is no need to read the directory and then write the directory to reflect a new owner. Ownership can remain with the processor 12 that reads the buffer 36. As such, the processor 12 can read the buffer 36, but due to the write restrictions imposed by the operating system 16 (that only one particular I/O controller 25 can write the buffer), the processor 12 is not permitted to write the buffer even though the processor retains ownership of the targeted lines of the buffers.

Before, however, the memory controller 20 writes I/O data from the I/O controller 25 to the buffer 36, the memory controller 20 takes an appropriate action with respect to the processor 12 to ensure data coherency. For example, if the processor 12 currently possesses a copy of the line, or a portion of the line, that is targeted by a write transaction by the I/O controller 25, the memory controller 20 will cause the processor 12 to invalidate its copy. Further, if the processor 12 has modified its copy, the memory controller 12 will cause the processor to write its copy back to the buffer 36 and then invalidates its copy. By causing the processor to invalidates its copy prevents the processor from using such data. Instead, the processor 12 will encounter a cache "miss" the next time it is to access such data and the targeted data will be supplied from memory 35. By that time, the I/O controller 25 will have already written its new I/O data to memory 35. Writing this latter "dirty" data back to memory permits the I/O controller 25 to ensure it has a coherent view of memory.

Figure 2:
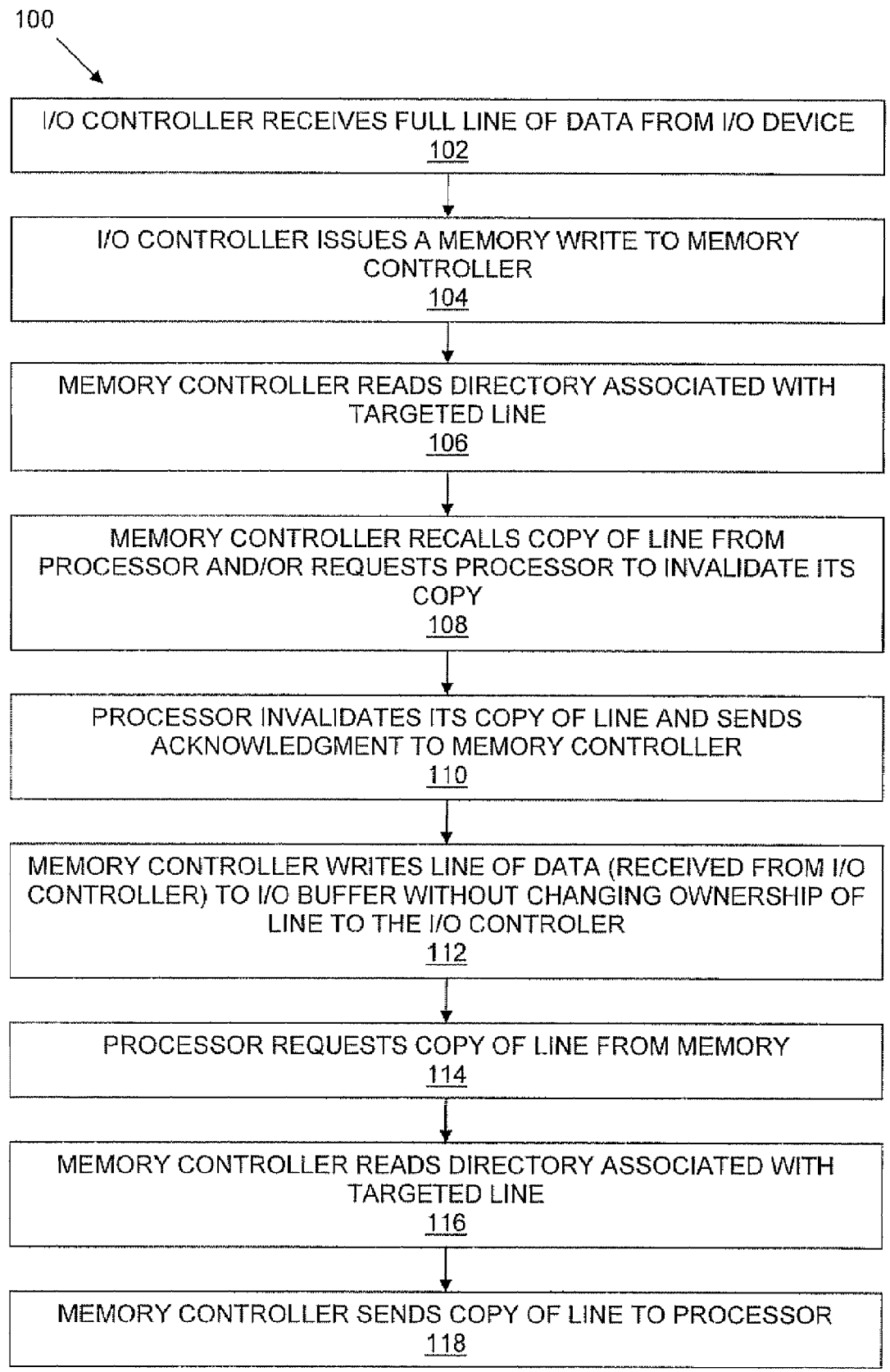
FIG. 2 shows a method in accordance with embodiments of the invention.

FIG. 2 illustrates a method 100 implemented on the system 10. It is assumed that the processor 12 contains a copy of data from a line targeted by a write transaction from the I/O controller. At 102, the I/O controller 25 receives a full or partial line of data from the I/O device 30. At 104, the I/O controller 25 issues a memory write transaction to the memory controller 20. After receiving the write transaction from the I/O controller 25, the memory controller 20, at 106, reads the directory associated with the line of data targeted by the I/O controller's write transaction. At 108, the memory controller recalls the copy of the line from the processor 12 (if the processor has modified the line) and, whether or not the processor has modified the data, requests the processor to invalidate its copy. At 110, the processor invalidates its copy of the data and sends an acknowledgement to that effect to the memory controller 20. At 112, the memory controller 20 writes the line of data, that was received from the I/O controller 25, to the I/O buffer 36 without changing ownership of the line to the I/O controller.

At some point in time later, the processor 12 may attempt to read the I/O buffer 36. In so doing, the processor at 114 requests a copy of a specified line of data from memory 35. The memory controller 20 reacts to the read requests by reading the directory entry associated with the specified line (116). If the directory indicates that the processor requesting the data is the owner of the line, the memory controller 20 sends a copy of the line to the processor (118). If a processor other than the current owner requests the data, the memory controller 20 updates the directory as is appropriate and provides the requested data.

The memory controller 20 comprises a queue in which multiple read and write transactions targeting memory 35 can be stored pending execution. In accordance with embodiments of the invention, the memory controller 20 also promotes a write of a given line ahead of a read of that same line to the extent a read and write of the same line are concurrently pending in the memory controller. This promotion insures that stale data is not read. As a result of these characteristics of the memory controller 20, data coherency is insured by the memory controller as follows.

As explained above, upon receiving a write transaction from the I/O controller 25, the memory controller 20 causes the processor 12 to invalidate its copy of the targeted line of data (assuming the processor 12 has a copy of the line). In causing the processor to invalidate its copy of the targeted line of data, the memory controller 20 effectively prevents a data incoherency between the processor 12 and the I/O controller 25 from occurring. Specifically, if the processor 12 attempts to read or write the same line for which the I/O controller 25 has just submitted a write transaction, the I/O controller's write transaction will precede the transaction from the processor. The processor's transaction will result in a cache miss (because of the previous invalidation process). The processor 12 will then attempt to retrieve the target data from the I/O buffer 36. By that time the I/O controller's write will be ahead of the processor's memory access and/or will already have been performed.

The embodiments described above enable a device, such as an I/O controller 25 to write memory without being given ownership of the targeted line. Not changing ownership means that the associated directory for the targeted line need not be written. As a result, the embodiments described herein reduce the number of writes to the directory which is provided in memory 35, thereby alleviating bus traffic and bandwidth problems.

The operating system 16 allocates memory 36 for various uses. If the operating system 16 allocates a buffer for use as an I/O buffer as described above, the memory controller 20 ceases to change ownership of each line as described above. For allocations of memory other than for uses in which only a single device is permitted to write the allocated memory, the memory controller 20 causes ownership changes to occur to permit a device to write such allocated memory.

The above discussion is meant to be illustrative of the principles and various embodiments of the present invention.

Numerous variations and modifications will become apparent to those skilled in the art once the above disclosure is fully appreciated. It is intended that the following claims be interpreted to embrace all such variations and modifications.

What is claimed is:

1. A method, comprising:
   while a first device has ownership of a data unit, a second device issuing a request to perform a memory write of said data unit; and
   a memory controller performing said memory write without changing ownership of said data unit.

2. The method of claim 1 further comprising permitting the second device, and not other devices, to write said data unit.

3. The method of claim 1 wherein said data unit resides in a memory buffer and said method further comprises permitting the second device, and not other devices, to write said memory buffer.

4. The method of claim 1 wherein said second device comprises an I/O controller and said data unit resides in a memory buffer, and said method further comprises allocating a memory buffer in which said data unit resides to be written by only one I/O controller and no other I/O controllers.

5. The method of claim 1 wherein said second device comprises an I/O controller and said data unit resides in a memory buffer, and said method further comprises an operating system executed allocating a memory buffer in which said data unit resides to be written by only one I/O controller and no other I/O controllers.

6. A system, comprising:
   a memory buffer;
   a first device;
   a second device; and
   a memory controller coupled to said memory buffer, first device, and second device, said memory controller performs a write to a target line within said memory buffer on behalf of the second device while said first device has ownership of said target line, without changing ownership of said line.

7. The system of claim 6 wherein said second device comprises an input/output (I/O) controller.

8. The system of claim 7 wherein said first device comprises a processor.

9. The system of claim 6 wherein said second device provides data to said first device via said memory buffer while said first device retains ownership of said target line.

10. The system of claim 6 further comprising an operating system that restricts write capability to said memory buffer to only said second device.

11. A system, comprising:
    a memory buffer;
    a first device;
    a second device; and
    means for performing a write to a target line within said memory buffer on behalf of the second device while said first device has ownership of said target line, without changing ownership of said line.

12. The system of claim 11 further comprising means for restricting write capability to said memory buffer to only said second device.

13. The system of claim 11 wherein said second device comprises an input/output device.

14. The system of claim 11 wherein said first device comprises a processor.

* * * * *